United States Patent
Lee

(10) Patent No.: US 7,256,724 B2
(45) Date of Patent: Aug. 14, 2007

(54) IMAGE SENSOR INCLUDING VARIABLE RAMPING SLOPE AND METHOD

(75) Inventor: Kwang-Hee Lee, Anyang-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/415,197

(22) Filed: May 2, 2006

(65) Prior Publication Data

US 2006/0249655 A1 Nov. 9, 2006

(30) Foreign Application Priority Data

May 3, 2005 (KR) .................. 10-2005-0037223

(51) Int. Cl.
*H03M 1/56* (2006.01)
(52) U.S. Cl. ..................... 341/169; 341/155
(58) Field of Classification Search ......... 341/155–170
See application file for complete search history.

(56) References Cited

U.S. PATENT DOCUMENTS

| | | | | |
|---|---|---|---|---|
| 4,012,290 A | * | 3/1977 | Olson ..................... 205/787 |
| 5,159,696 A | * | 10/1992 | Hartnett ..................... 377/55 |
| 5,414,611 A | * | 5/1995 | Muto et al. ............... 363/21.15 |
| 5,508,658 A | * | 4/1996 | Nishioka et al. ............ 330/273 |
| 7,012,557 B2 | * | 3/2006 | Takayanagi et al. ........ 341/155 |
| 2006/0250114 A1 | * | 11/2006 | Faberman et al. ............ 322/24 |

FOREIGN PATENT DOCUMENTS

| | | |
|---|---|---|
| JP | 07-202701 | 8/1995 |
| JP | 2003-060507 | 2/2003 |
| KR | 1020040072237 A | 8/2004 |

* cited by examiner

*Primary Examiner*—Lam T. Mai
(74) *Attorney, Agent, or Firm*—Volentine & Whitt, PLLC

(57) ABSTRACT

An image sensor an image sensor includes an image sensing element which converts incident light into an analogue signal, a voltage generator which includes a variable resistor circuit and which generates a ramping voltage, where a slope of the ramping voltage is variable and corresponds a resistance value of the variable resistor circuit, a converter which converts a voltage of the analogue signal into a digital signal using the ramping voltage generated by the voltage generator, and a controller which controls the resistance value of the variable resistance circuit.

11 Claims, 7 Drawing Sheets

IMAGE SENSOR INCLUDING VARIABLE RAMPING SLOPE AND METHOD

BACKGROUND OF THE INVENTION

1. Field of the Invention

The present invention generally relates to image sensors and, more particularly, the present invention relates to image sensors with a function of amending a ramping slope.

A claim of priority is made to Korean Patent Application 2005-37223 filed on May 3, 2005, the disclosure of which is hereby incorporated by reference.

2. Description of the Related Art

Photodiodes are used in image sensors to transform optical signals into electrical analog signals. In order to display the output of the photodiodes (i.e., images) on display devices such as, for example, LCD monitors, it is generally necessary to convert the analogue signals into digital signals. Analogue-to-digital converters (ADC) are utilized for this purpose.

The resolution of an ADC generally correlates to the number of binary bits contained in the digital output. More bits in the digital output means greater sampling of the analogue input.

Various types of ADCs are used to obtain digital signals from analogue signals, including, for example, parallel-comparing ADCs, integral ADCs, staircase ADCs, tracking ADCs, and so on.

Integrating ADCs (also known as ramp-compare ADCs) in particular are used to transform analogue signals into digital signals with high precision. Generally, an integrating ADC includes a ramp voltage generator, a comparator, and a counter. During each sampling period, a ramp voltage from the generator is continuously compared by the comparator with an analogue input signal, and the counter outputs a digital value indicative of the time period expended for the ramp voltage to equal or exceed that analogue input voltage.

FIG. 1 is a graph showing the input-output pattern of a conventional analogue-digital converter (ADC) which includes a single slope integrating ADC circuit. In FIG. 1, the vertical axis represents the digital binary output value (i.e., the counter value) of the ADC, while the horizontal axis represents the analog input voltage of the ADC, i.e., the analog voltage supplied from a photodiode. By way of example, FIG. 1 shows the input-output pattern of a 10-bit ADC.

In FIG. 1, plot 2 depicts the "normal" input-output pattern corresponding to a desired design target. Plot 1 depicts a defective input-output pattern having a slope which is greater than that of plot 2, and plot 3 depicts a defective input-output pattern having a slope which is smaller than that of plot 2. The defective input-output patterns depicted by plots 1 and 3 may result from differing resistance values of resistors forming a ramping voltage generator of the ADC. This variance in resistor values generally results from process variations (e.g., implantation variations) inevitably encountered during manufacture of semiconductor devices. While defective input-output pattern characteristics of the ADCs can be improved with improvements in fabrication techniques, it is generally not possible to completely eliminate all process variations which might impact ADC input-output patterns.

SUMMARY OF THE INVENTION

According to an aspect of the present invention, an image sensor is provided which includes an image sensing element which converts incident light into an analogue signal, a voltage generator which includes a variable resistor circuit and which generates a ramping voltage, where a slope of the ramping voltage is variable and corresponds a resistance value of the variable resistor circuit, a converter which converts a voltage of the analogue signal into a digital signal using the ramping voltage generated by the voltage generator, and a controller which controls the resistance value of the variable resistance circuit.

According to another aspect of the present invention, a method of controlling the slope of a ramping voltage is provided which includes receiving an address to adjust a resistance value, establishing the resistance value in correspondence with the address, generating a ramping voltage in correspondence with the established resistance value, determining whether the ramping voltage matches a target voltage, and storing the address when the ramping voltage matches the target voltage.

BRIEF DESCRIPTION OF THE FIGURES

Non-limiting and non-exhaustive embodiments of the present invention will be described with reference to the accompanying drawings, in which like reference numerals denote like elements unless otherwise specified, and in which.

DETAILED DESCRIPTION OF PREFERRED EMBODIMENTS

The invention will now be described by way of preferred, but non-limiting, embodiments of the invention. The invention may, however, be embodied in different forms and should not be constructed as limited to the embodiments set forth herein.

Figure 1:
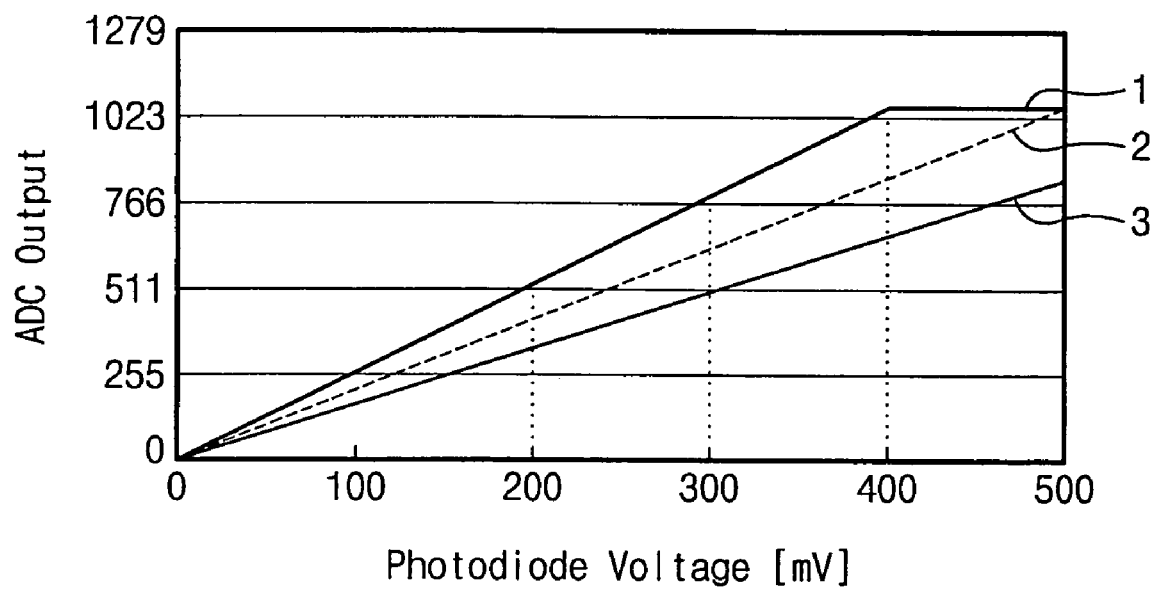
FIG. 1 is a diagram showing ideal and defective input-output patterns of a conventional analogue-digital converter.
Figure 2:
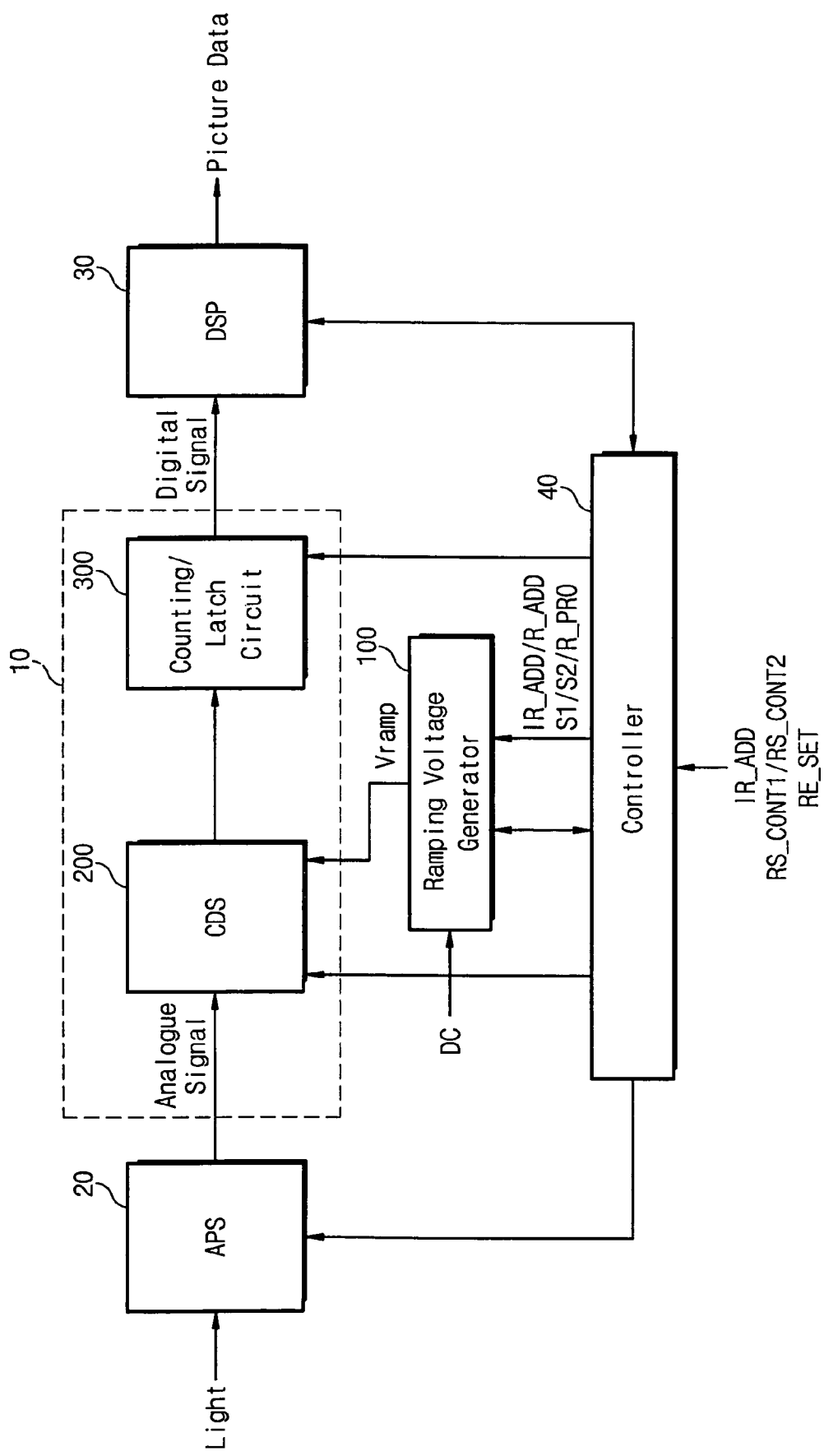
FIG. 2 is a block diagram illustrating a CMOS image sensor in accordance with an embodiment of the present invention.

FIG. 2 is a block diagram illustrating a CMOS image sensor in accordance with an embodiment of the present invention. Referring to FIG. 2, the CMOS image sensor (CIS) is comprised of an active pixel sampling (APS) block 20, an ADC 10, a digital signal processor (DSP) 30, a ramping voltage generator 100, and a controller 40.

The APS block 20 includes an image sensing element (for example, a photodiode) that converts the intensity of light incident through an optical lens into a corresponding analogue signal that is applied to the ADC 10.

The ADC 10 includes a correlated double sampling (CDS) circuit 200 and a counting/latch circuit 300 which, as will explained later, generate a digital signal corresponding to a voltage of the analogue signal provided from the APS block 20.

The DSP 30 subjects the digital signal from the ADC 10 to image signal processing in order to produce suitable picture data for display on a display unit (not shown) such as an LCD monitor.

The ramping voltage generator 100 generates a ramping voltage Vramp from a supply voltage DC. As will be explained in more detail later, a slope of the ramping voltage Vramp is variably set under control of the controller 40.

The controller 40 supplies various operational control signals to the APS block 20, the ADC 10, and the DSP 30. In addition, as will be explained in more detail later, the controller 40 provides control signals to the ramping voltage generator 100 in order to adjust a resistance value of a resistor circuit of the ramping voltage generator 100.

In the example of this embodiment, the CDS circuit 200 of the ADC 10 includes a comparator which compares the voltage of the analogue signal from the APS block 20 and the ramping voltage Vramp from the ramping voltage generator 100. Also in this example, the counting/latch circuit 300 includes a counter which is continuously incremented until such time the output of the CDS circuit 200 indicates that the ramping voltage Vramp is equal to or greater than the voltage of the analogue signal supplied from the APS 20. The resultant count value is stored in a latch and then output as a corresponding multi-bit digital signal to the DSP 30.

Figure 3:
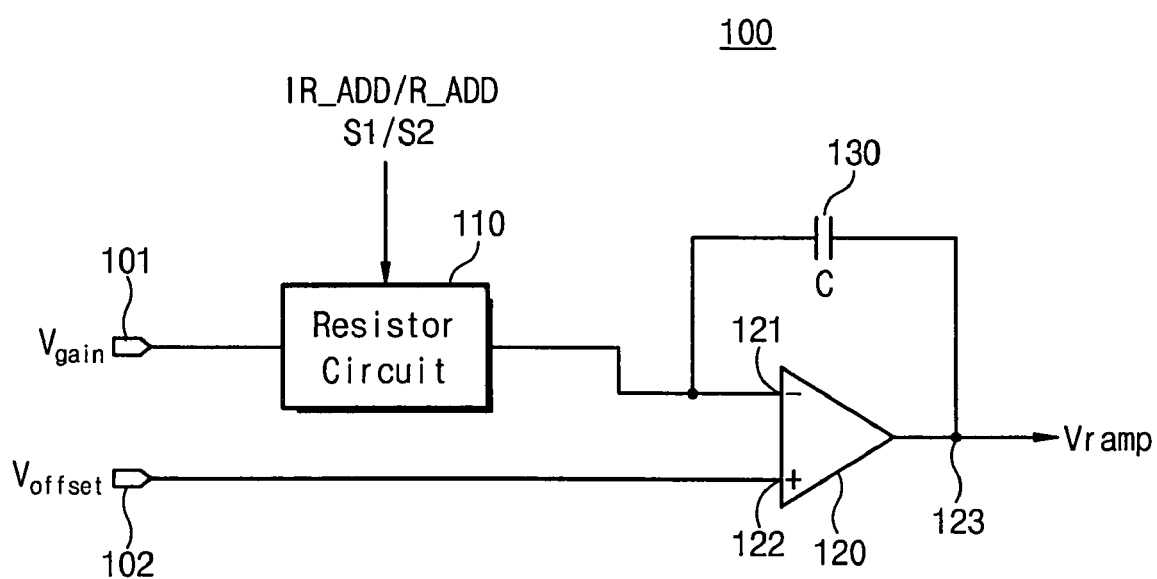
FIG. 3 is a block diagram illustrating a ramping voltage generator shown in FIG. 2 in accordance an embodiment of the present invention.

FIG. 3 is a block diagram illustrating an example of the ramping voltage generator 100 shown in FIG. 2 in accordance with an embodiment of the present invention. Referring to FIG. 3, the ramping voltage generator 100 includes input terminals 101 and 102 through which DC voltages V gain and Voffset are supplied, a resistor circuit 110, an operational amplifier 120, and a capacitor 130.

The resistor circuit 110 may be connected between the input terminal 101, to which the DC voltage $V_{gain}$ is applied, and a negative input node 121 of the operational amplifier 120. In addition, as will be explained in more detail later, the resistance of the resistor circuit 110 may be variable in accordance with an address signals IR_ADD and R_ADD and control signals S1, S2 and R_PRO. In this manner, a resistance value of the negative input node 121 is established in correspondence with the address IR_ADD.

The operational amplifier 120 includes the negative input node 121, a positive input node 122, and an output node 123 (i.e., an output terminal of the ramping voltage generator 100). As mentioned above, the negative input node 121 is connected to the resistor circuit 110. The positive input node 122 is connected to the input terminal 102 of the ramping voltage generator 100 to which the offset voltage $V_{offset}$ is applied. A capacitor 130 is connected between the output terminal 123 and the negative input node 121 of the operational amplifier 120 to form a feedback loop.

In the example of this embodiment, when the DC voltages $V_{gain}$ and $V_{offset}$ are set to provide a voltage differential across the input terminals 101 and 102 of the ramping voltage generator 100, a ramping voltage Vramp having a slope of 1/RC is generated at the output terminal 123 of the operation amplifier 120. Here, R denotes a resistance value of the resistor circuit 110 and C denotes a capacitance value of the capacitor 130.

Figure 4:
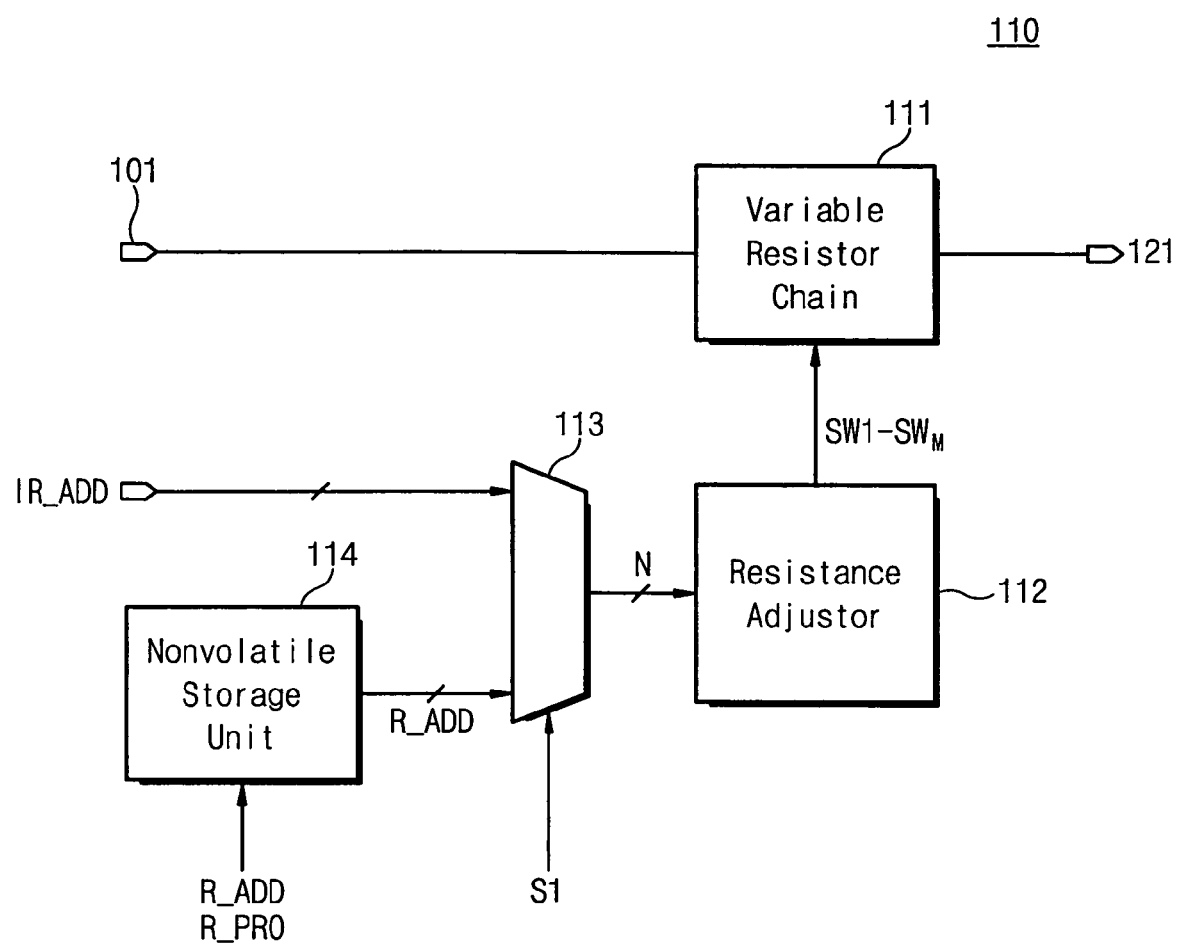
FIG. 4 is a block diagram illustrating a resistor circuit shown in FIG. 3 in accordance with an embodiment of the present invention.

FIG. 4 is a block diagram illustrating an example of the resistor circuit 110 shown in FIG. 3 in accordance with an embodiment of the present invention. Referring to FIG. 4, the resistor circuit 110 of this example includes a variable resistor chain 111, a resistance adjustor 112, an address selector 113, and a nonvolatile storage unit 114.

The variable resistor chain 111 is connected between the input terminal 101 and the negative input node 121 of the operation amplifier 120, and a resistance value of the variable resistor chain 111 is set by switching control signals SW1-SWM supplied by the resistance adjustor 112.

The resistance adjustor 112 is controlled according to an N-bit signal output by the address selector 113. In particular, the address selector 113 is responsive to a control signal S1 to selectively output either an address IR_ADD from the controller 40 or an address R_ADD from the nonvolatile storage unit 114 as the N-bit signal supplied to the resistance adjustor 112.

The nonvolatile storage unit 114 stores one or more addresses R_ADD in response to a control signal R_PRO from the controller 40 to program a resistance value provided from the controller 40. In the example of this embodiment, the nonvolatile storage unit 114 is configured as an electrically erasable and programmable ROM (EEPROM). Alternatively, the nonvolatile storage unit 114 may be configured as a resistive fuse bank. If the nonvolatile storage unit 114 is configured as a resistive fuse bank, bias currents may be selectively applied to selectively blow resistive fuses indicative of a desired resistance value.

Figure 5:
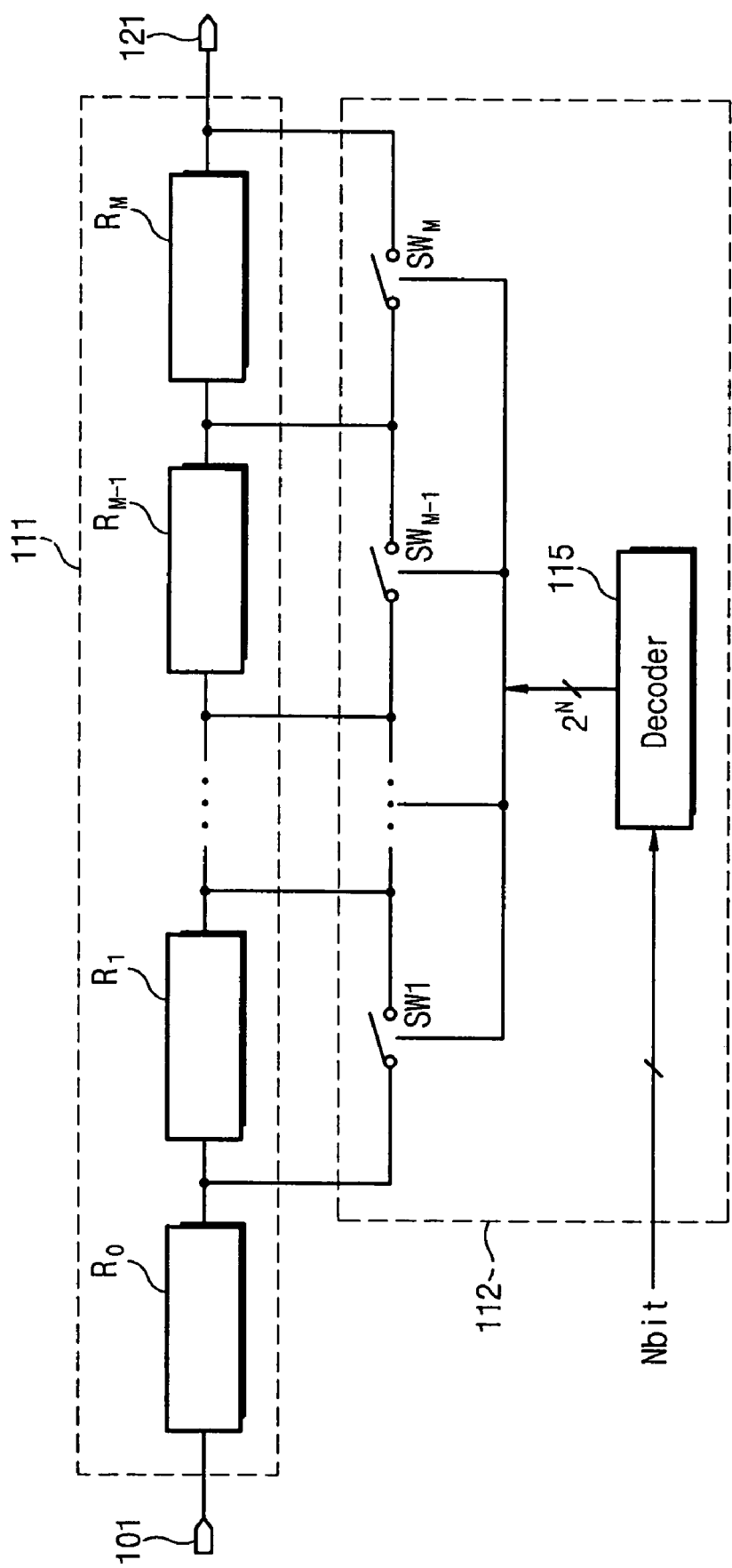
FIG. 5 is a block diagram illustrating a variable resistor chain and a resistance adjustor shown in FIG. 4 in accordance with an embodiment of the present invention.

FIG. 5 is a block diagram illustrating an example of the variable resistor chain 111 and the resistance adjustor 112 shown in FIG. 4 according to an embodiment of the present invention. Referring to FIG. 5, the resistance adjustor 112 of this example includes decoder 115 and pluralities of switches SW1~SWM.

The decoder 115 controls on/off states of the switches SW1~SWM, which are arranged in numbers of $2^N$ (where in N is the number of address bits), by decoding the N-bit address IR_ADD or R_ADD. The switches SW1~SWM are coupled to corresponding resistors R1~RM of the resistor chain 111. The resistors R1~RM are selectively in series between the terminals 101 and 121 by the on/off operations of the switches SW1~SWM. The variable resistor chain 111 is composed of the resistors $R0~R_M$, where $M=2^N+1$. In an exemplary embodiment, the resistors $R0~R_M$ are formed of polysilicon. Further, in an exemplary embodiment, the resistors $R0~R_M$ of the resistor chain 111 increase in resistance by a predetermined factor. For example, the respective resistance values of the resistors $R0~R_M$ may increase by a factor of 2 (e.g., $2^0, 2^1, 2^2, 2^{M-1}$, and $2^M$, respectively) along the resistor chain 111.

Figure 6:
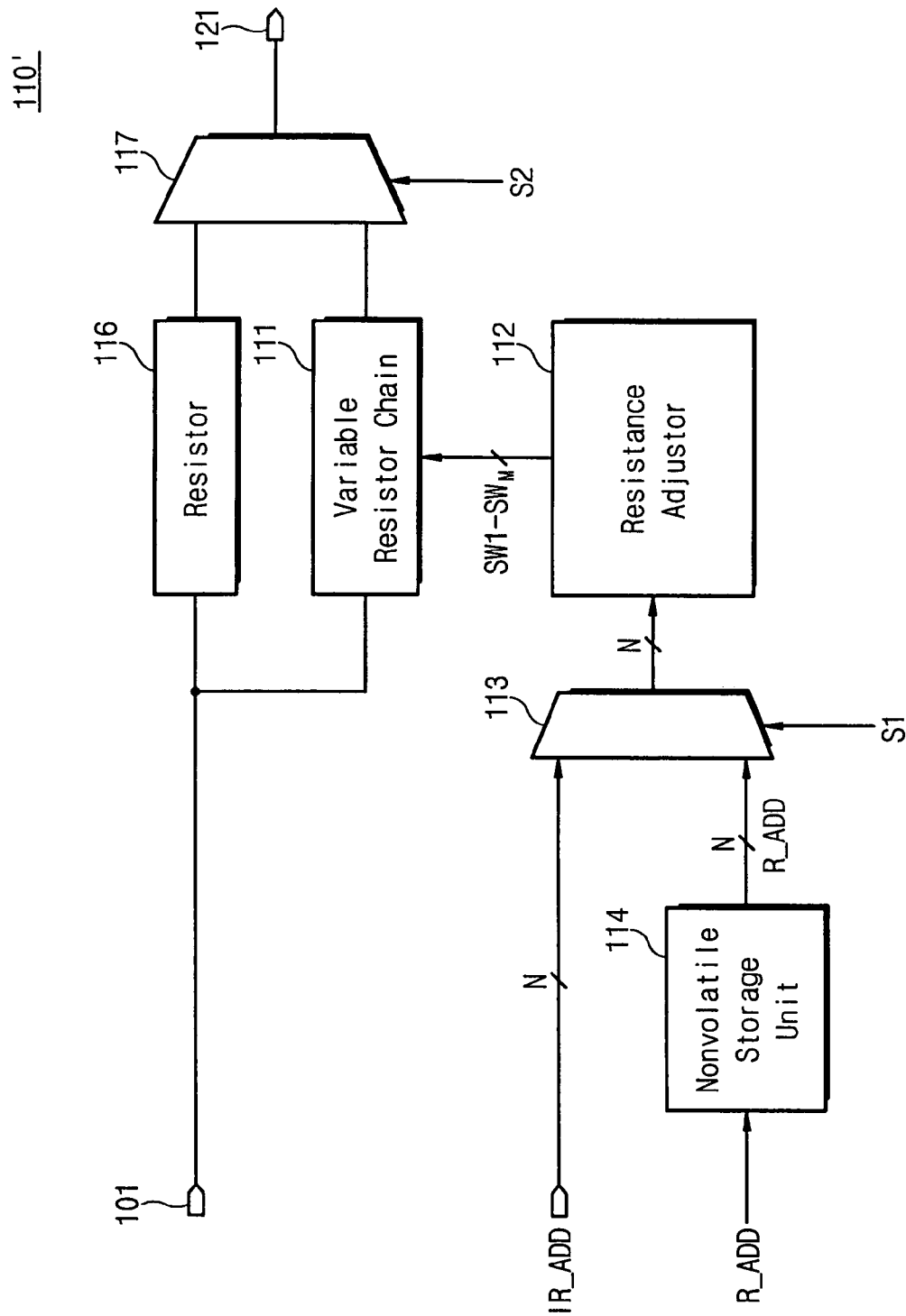
FIG. 6 is a block diagram illustrating a resistor circuit shown in FIG. 3 in accordance with another embodiment of the present invention.

FIG. 6 is a block diagram illustrating another example of the resistor circuit 110 shown in FIG. 3 in accordance with another embodiment of the present invention. Referring to FIG. 6, the resistor circuit 110' of this example includes a variable resistor chain 111, a resistance adjustor 112, an address selector 113, a nonvolatile storage unit 111, a resistor 116, and a multiplexer 117.

The variable resistor chain 111, the resistance adjustor 112, the address selector 113, and the nonvolatile storage unit 111 of FIG. 6 operate in the same manner as the like numbered elements of previously described FIG. 4. Accordingly, a detailed description of the operation of these elements in FIG. 6 is omitted here to avoid redundancy.

In the example of this embodiment, the resistor 116 has a fixed resistance and is operatively connected in series between the terminal nodes 101 and 121 via the multiplexer 117. The multiplexer 117 is responsive to a control signal S2 to connect either the resistor 116 or the variable resistor chain 111 to the terminal node 121 (i.e., to the negative input node 121 of the operational amplifier 120 of FIG. 2). The resistor 116 may formed of polysilicon.

Figure 7:
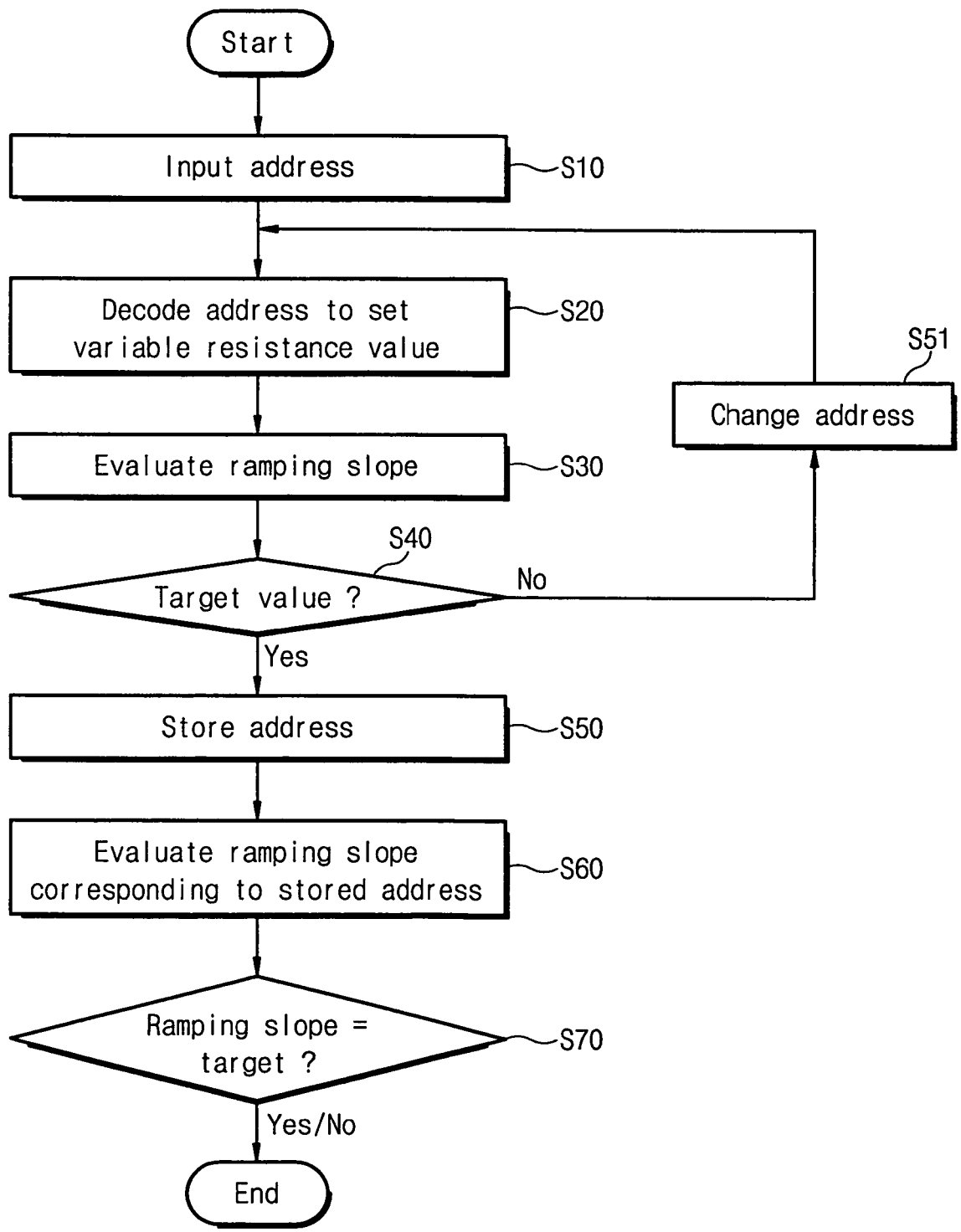
FIG. 7 is a flow chart for use in explaining a method of changing a ramping slope in accordance with an embodiment of the present invention.

FIG. 7 is a flow chart for use in describing a method of varying the slope of a ramping voltage in accordance with an embodiment of the present invention. Hereinafter, a method of varying the slope of the ramping voltage by changing a resistance value of the ramping voltage generator 100 will be described with reference to FIGS. 2, 4, 5, and 7.

At step 10 (S10), a user inputs an external signal RS_CONT1 into the controller 40 for generating the address IR_ADD to the ramping voltage generator 100. The controller 40 transfers the address IR_ADD and the control signal S1 to the address selector 113 of the resistor circuit 110 in response to the external signal RS_CONT1. The address selector 113 transfers the address IR_ADD to the resistance adjustor 112 in response to the control signal S1. The address selector 113 may be a multiplexer outputting any one of the address IR_ADD of the controller 40 and the address R_ADD of the nonvolatile storage unit 114 in response to a high level of the control signal S1.

At step 20 (S20), the decoder 115 of the resistance adjustor 112 decodes the N-bit address IR_ADD to select among the $2^N$ switches SW1~SWM. Specifically, the decoder 115 controls the on/off conditions of the switches SW1~SWM based on the N-bit address IR_ADD. The on/off conditions of the switches SW1~SWM set the resistance value R of the variable resistor chain 111 by selectively short circuiting one or more corresponding resistors R1~RM.

At step 30 (S30), the ramping voltage Vramp is generated in correspondence with the resistance value R established by the variable resistor chain 111. Furthermore, a digital signal is generated corresponding to the ramping voltage Vramp. At step 40 (S40), if the ramping voltage Vramp is not identical to a predetermined target voltage that has been set while designing the circuit, the address IR_ADD is changed and reapplied to the controller 40. At step 51 (S51), the controller 40 transfers the new address IR_ADD to the address selector 113. If the changed address IR_ADD is applied to the resistance adjustor 112, the resistance adjustor 112 decodes the new address IR_ADD to control the on/off conditions of the switches SW1~SWM. Thus, the resistance value R of the variable resistor chain 111 is established by again executing the step of decoding the address IR_ADD (step S20).

If the ramping voltage Vramp corresponding to the resistance value R of the variable resistor chain 111 does not match the target voltage (steps S30 and S40) despite being changed once, the aforementioned steps S20 through S40 are repeated until the ramping voltage Vramp reaches the target voltage.

Thus, as described above, it is possible to determine whether a ramping slope is correct by comparing a predetermined digital output value (i.e., a target digital value) with the output digital value of the ADC 10 corresponding to the adjusted ramping voltage Vramp.

If the digital signal correspond to the adjusted ramping voltage is identical to the target digital value, then a signal RS_SET is applied to the controller 40 to finally set the resistance value. The controller 40 generates the control signal R_PRO to program the changed address R_ADD into the nonvolatile storage unit 114 (such as a resistive fuse bank) in response to the signal RS_SET. At step 50 (S50), the nonvolatile storage unit 114 stores the address R_ADD supplied from the controller 40, in response to the control signal R_PRO. Furthermore, the controller 40 controls the address selector 113 to supply the address R_ADD from the nonvolatile storage unit 114 to the resistance adjustor 112. This may be accomplished by, for example, the controller 40 applying the control signal S1 to the address selector 113.

At step 70 (S70), the aforementioned steps S20 through S40 may be repeated in order to confirm that the ramping voltage Vramp is identical to the target voltage in correspondence with the address R_ADD stored in the nonvolatile storage unit 114 (step S70).

The operation of a single-slope integrating circuit (or ramping voltage generator) embedded in an integrating ADC according to an alternative exemplary embodiment of the resistor circuit 110 as shown in FIG. 6 will now be described. The method associated with FIG. 6 is similar to that of previously described FIG. 7 (associated with the resistor circuit 110 of FIG. 4), and common steps between the two methods will not be described in detail here to avoid redundancy.

In an embodiment employing the resistor circuit 110' of FIG. 6, the controller 40 applies the enabling signal S2 to the multiplexer 117 in response to a signal RS_CONT2 supplied from an external source. The multiplexer 117 connects the resistor 116 to the negative input node 121 of the operation amplifier 122 in response to the enabling signal S2 (e.g., a high-level signal). Then, the ramping voltage Vramp is generated in correspondence with the resistance value R of the resistor 116 and a digital signal is generated as an output of the ADC 10 in correspondence with the ramping voltage Vramp.

When the ramping voltage Vramp corresponding to the resistance value R of the resistor 116 does not match a designed target value (or the output of the ADC 10 does not match a designed target value), the controller 40 receives the external signal RS_CONT1 and the address IR_ADD. The controller 40 applies the enabling signal S2 (e.g., a low-level signal) to the multiplexer 117 in response to the external signal RS_CONT1, coupling the variable resistor chain 111 with the negative input node 121 of the operational amplifier 120. The controller 40 also applies the address IR_ADD and the control signal S1 to the address selector 113. Thereafter, the aforementioned steps S10~S70 of previously described FIG. 7 may be repeated.

If the ramping voltage Vramp corresponding to the resistance value R of the resistor 116 is identical to a designed target value (or the output of the ADC 10 is the same as a designed target value), there may be no need to alter the ramping voltage Vramp by controlling the variable resistor chain 111.

The foregoing embodiments are teaching examples only. Those of ordinary skill in the art will understand that various changes in form and details may be made to the exemplary embodiments without departing from the scope of the present invention which is defined by the following claims.

What is claimed is:

1. An image sensor comprising:
   an image sensing element which converts incident light into an analogue signal;
   a voltage generator which includes a variable resistor circuit and which generates a ramping voltage, wherein a slope of the ramping voltage is variable and corresponds a resistance value of the variable resistor circuit;
   a converter which converts a voltage of the analogue signal into a digital signal using the ramping voltage generated by the voltage generator; and
   a controller which controls the resistance value of the variable resistance circuit;
   wherein a slope of the ramping voltage is linear, and wherein the voltage generator further includes an operational amplifier including an input connected to the variable resistance circuit, and a capacitor connected across the input and an output of the operational amplifier, and wherein the variable resistance circuit comprises:

a nonvolatile storage unit which stores a first address in response to a first control signal;

an address selector which selectively outputs the first address from the nonvolatile storage unit or a second address from the controller in response to a second control signal;

a variable resistor chain coupled between an input terminal of the voltage generator and the input of the operational amplifier; and a resistance adjustor which sets a resistance value of the variable resistor chain in accordance with the output from the address selector.

2. The image sensor as set forth in claim 1, wherein the variable resistor chain includes a plurality of resistors connected in series and having respectively different resistance values.

3. The image sensor as set forth in claim 2, wherein the resistors are formed of polysilicon.

4. The image sensor as set forth in claim 2, wherein the resistance adjustor comprises:

a decoder which decodes the output of the address selector to generate corresponding switching signals; and a plurality of switches coupled across the resistors which selectively bypass the resistors in response to the switching signals generated by the decoder.

5. The image sensor as set forth in claim 1, wherein the nonvolatile storage unit comprises a resistive fuse bank.

6. An image sensor comprising:

an image sensing element which converts incident light into an analogue signal;

a voltage generator which includes a variable resistor circuit and which generates a ramping voltage, wherein a slope of the ramping voltage is variable and corresponds a resistance value of the variable resistor circuit;

a converter which converts a voltage of the analogue signal into a digital signal using the ramping voltage generated by the voltage generator; and a controller which controls the resistance value of the variable resistance circuit;

wherein a slope of the ramping voltage is linear, and wherein the voltage generator further includes an operational amplifier including an input connected to the variable resistance circuit, and a capacitor connected across the input and an output of the operational amplifier, and wherein the variable resistance circuit further comprises:

a multiplexer connected between the variable resistor chain and the input of the operational amplifier; and a resistor connected between the input terminal of the voltage generator and the multiplexer;

wherein the multiplexer selectively connects at least one of the resistor and the variable resistor chain to the input of the operational amplifier in response to an enabling signal from the controller.

7. The image sensor as set forth in claim 6, wherein the resistor is formed of polysilicon.

8. A method of controlling the slope of a ramping voltage, comprising:

receiving an address to adjust a resistance value;

establishing the resistance value in correspondence with the address;

generating a ramping voltage in correspondence with the established resistance value;

determining whether the ramping voltage matches a target voltage; and storing the address when the ramping voltage matches the target voltage.

9. The method as set forth in claim 8, further comprising:

receiving a new address when the ramping voltage differs from the target voltage;

establishing a new resistance value in correspondence with the new address;

generating a new ramping voltage in correspondence with the new resistance value; and determining whether the new ramping voltage matches the target voltage.

10. The method as set forth in claim 9, further comprising:

evaluating the ramping voltage corresponding to the stored address; and determining whether the ramping voltage matches the target voltage.

11. The method as set forth in claim 10, wherein evaluating the ramping voltage comprises:

decoding the stored address to establish a resistance value; and generating a ramping slope in correspondence with the established resistance value.

* * * * *